(12) United States Patent
Garcia et al.

(10) Patent No.: US 10,603,873 B2
(45) Date of Patent: Mar. 31, 2020

(54) HYBRID METAL COMPOSITE STRUCTURES, ROCKET CASES, AND RELATED METHODS

(71) Applicant: Northrop Grumman Innovation Systems, Inc., Plymouth, MN (US)

(72) Inventors: Benjamin W. C. Garcia, Tremonton, UT (US); Elizabeth Bonderson, Pleasant View, UT (US); Brian Christensen, Willard, UT (US); David R. Nelson, Logan, UT (US)

(73) Assignee: Northrop Grumman Innovation Systems, Inc., Plymouth, MN (US)

( * ) Notice: Subject to any disclaimer, the term of this patent is extended or adjusted under 35 U.S.C. 154(b) by 656 days.

(21) Appl. No.: 15/250,404

(22) Filed: Aug. 29, 2016

(65) Prior Publication Data

US 2018/0126702 A1 May 10, 2018

(51) Int. Cl.
*B32B 15/14* (2006.01)
*B29C 70/78* (2006.01)
(Continued)

(52) U.S. Cl.
CPC .............. *B32B 15/14* (2013.01); *B29C 70/78* (2013.01); *B29C 70/885* (2013.01); *B32B 3/266* (2013.01);
(Continued)

(58) Field of Classification Search
CPC ........... B32B 15/14; B32B 3/266; B32B 7/08; B32B 15/092; B32B 3/28; B32B 2605/18; B29C 70/885; B29C 70/78; F02K 9/34; F05D 2300/603; F05D 2063/00; F05D 2105/08; F05D 2230/10; F05D 2230/90; B29L 2031/3076; B29K 2705/08; B29K 2307/04
See application file for complete search history.

(56) References Cited

U.S. PATENT DOCUMENTS

| | | | |
|---|---|---|---|
| 5,348,603 A | 9/1994 | Yorgason | |
| 5,866,272 A * | 2/1999 | Westre | B32B 3/12 428/593 |

(Continued)

OTHER PUBLICATIONS

Garcia et al. U.S. Appl. No. XX/XXX,XXX, filed even date herewith and entitled "Hybrid Metal Composite Structures, Rocket Motors and Multi-Stage Rocket Motor Assemblies Including Hybrid Metal Composite Structures, and Related Methods", 38 pages.

(Continued)

*Primary Examiner* — Nancy R Johnson
(74) *Attorney, Agent, or Firm* — TraskBritt

(57) ABSTRACT

A method of forming a hybrid metal composite structure including at least one metal ply. The method includes forming at least one metal ply, forming the at least one metal ply comprising forming at least one perforation in the at least one metal ply, abrasively blasting at least one surface of the at least one metal ply to coarsen the at least one surface of the metal ply, and exposing the at least one metal ply to at least one of an acid or a base. The method further includes disposing at least one fiber composite material structure adjacent the at least one metal ply. Related methods of forming a portion of a rocket case and related hybrid metal composite structures are also disclosed.

25 Claims, 7 Drawing Sheets

(51) Int. Cl.
| | |
|---|---|
| *B32B 15/092* | (2006.01) |
| *B32B 3/26* | (2006.01) |
| *B32B 3/28* | (2006.01) |
| *B32B 7/08* | (2019.01) |
| *F02K 9/34* | (2006.01) |
| *B29C 70/88* | (2006.01) |
| *B29K 105/08* | (2006.01) |
| *B29K 63/00* | (2006.01) |
| *B29K 307/04* | (2006.01) |
| *B29K 705/08* | (2006.01) |
| *B29L 31/30* | (2006.01) |

(52) U.S. Cl.
CPC .............. *B32B 3/28* (2013.01); *B32B 7/08* (2013.01); *B32B 15/092* (2013.01); *F02K 9/34* (2013.01); *B29K 2063/00* (2013.01); *B29K 2105/08* (2013.01); *B29K 2307/04* (2013.01); *B29K 2705/08* (2013.01); *B29L 2031/3076* (2013.01); *B32B 2605/18* (2013.01); *F05D 2230/10* (2013.01); *F05D 2230/90* (2013.01); *F05D 2300/603* (2013.01); *F05D 2300/6032* (2013.01)

(56) References Cited

U.S. PATENT DOCUMENTS

| | | | | |
|---|---|---|---|---|
| 6,037,060 | A | * | 3/2000 | Blohowiak .............. B32B 7/12 427/301 |
| 7,115,323 | B2 | | 10/2006 | Westre et al. |
| 8,636,936 | B2 | | 1/2014 | Modin et al. |
| 8,715,439 | B2 | | 5/2014 | Chakrabarti et al. |
| 8,993,084 | B2 | | 3/2015 | Griess et al. |
| 9,090,043 | B2 | | 7/2015 | Matsen et al. |
| 9,102,571 | B2 | | 8/2015 | Szweda et al. |
| 2001/0032568 | A1 | * | 10/2001 | Schutt .................... C09D 4/00 106/287.11 |
| 2010/0078259 | A1 | | 4/2010 | Stevenson et al. |
| 2012/0003495 | A1 | | 1/2012 | Cavaliere et al. |
| 2012/0045606 | A1 | | 2/2012 | Gruess et al. |
| 2013/0034705 | A1 | * | 2/2013 | Matsen .................... B32B 7/12 428/189 |
| 2015/0159587 | A1 | | 6/2015 | Facciano et al. |
| 2015/0183185 | A1 | | 7/2015 | Chang |
| 2015/0328863 | A1 | * | 11/2015 | Walsh .................... B32B 15/20 428/447 |
| 2015/0375478 | A1 | * | 12/2015 | Gruhn .................... B32B 5/26 442/286 |
| 2017/0158806 | A1 | * | 6/2017 | Peters .................... C07D 405/12 |

OTHER PUBLICATIONS

Thakre et al. "Solid Propellants" Encyclopedia of Aerospace Engineering. p. 1-10, Edited by Richard Blockley and Wei Shyy, 2010 John Wiley & Sons, Ltd. ISBN: 978-0-470-68665-2.

Ucsnik et al "Experimental Investigation of a Novel Hybrid Metal-Composite Joining Technology" Article, Composites: Part A 41 (2010) pp. 369-374; 2009 Elsevier Ltd.

The Engineering Tool Box, STP—Standard Temperature and Pressure & NTP—Normal Temperature and Pressure, Jun. 15, 2006 (Year: 2006).

Velea, M.N., Thermal Expansion of Composite Laminates, 2015, Bulletin of the Transilvania University of Brasov, vol. 8 (Year: 2015).

* cited by examiner

HYBRID METAL COMPOSITE STRUCTURES, ROCKET CASES, AND RELATED METHODS

CROSS-REFERENCE TO RELATED APPLICATION

The present application is related to co-pending U.S. patent application Ser. No. 15/250,536, filed Aug. 29, 2016, and entitled "HYBRID METAL COMPOSITE STRUCTURES, ROCKET MOTORS AND MULTI-STAGE ROCKET MOTOR ASSEMBLIES INCLUDING HYBRID METAL COMPOSITE STRUCTURES, AND RELATED METHODS," the disclosure of which is hereby incorporated herein it its entirety by this reference.

TECHNICAL FIELD

Embodiments disclosed herein relate to hybrid metal composite structures including at least one metal ply disposed in a fiber composite material, to related hybrid metal composite structures, and to related methods of forming a portion of a rocket case. More particularly, embodiments disclosed herein relate to methods of preparing a surface of at least one metal ply to facilitate improved adhesion between at least one surface of the at least one metal ply and a fiber composite material structure in a hybrid metal composite structure, to methods of forming rocket cases including the hybrid metal composite structure, and to related methods.

BACKGROUND

Fiber composite materials include reinforcing fibers embedded in a matrix material. One example of a fiber composite material is a carbon fiber composite (CFC), which includes reinforcing carbon fibers embedded in a matrix material. CFCs may exhibit a variety of desired properties, such as high temperature stability, high thermal resistance, high mechanical integrity, light weight, corrosion resistance, and desired electrical and magnetic properties. By way of nonlimiting example, CFCs may exhibit a greater strength at a lower overall weight than metal materials. CFCs can thus be used to form a number of industrial and military structures including, for example, aerospace, marine, and automotive structures requiring one or more of the aforementioned properties.

Structures formed of composite materials have been coupled together to form components of rocket motors, such as rocket motor casings. However, fiber composite materials may exhibit an increased stress concentration at locations proximate the fasteners (e.g., bolts, rods, pins, etc.) used to couple the fiber composite material structures together. Accordingly, the resulting assembly may exhibit a low bearing strength at locations proximate the fasteners. To overcome such problems, it is known to manufacture fiber composite material structures to have an increased thickness at locations where the fiber composite material structure will be coupled to another material structure (e.g., another fiber composite material structure). In some instances, the fiber composite materials of such structures may be two to three times thicker proximate the fastener regions than in other regions thereof. Unfortunately, increasing the thickness of the fiber composite materials proximate the fastener regions undesirably increases an overall weight of a fiber composite material assembly formed of and including the fiber composite material structures.

Methods of improving the bearing strength of a fiber composite material without increasing the thickness thereof include placing thin metallic structures (e.g., thin metal plies) in the fiber composite material to form a hybrid metal composite structure comprising the fiber composite material and the metal plies. The metal plies may reduce an overall weight of the structure by as much as about 30 percent. In some applications, this reduction in weight may correspond to a reduction in thousands of pounds. However, fabrication of composite structures including metal plies is difficult due to, among other things, poor adhesion of the metal ply surfaces to the resin of the fiber composite material. Poor adhesion may result in delamination of the metal ply from the hybrid metal composite structure and failure of the hybrid metal composite structure.

BRIEF SUMMARY

Embodiments disclosed herein include hybrid metal composite structures as well as related methods. For example, in accordance with one embodiment, a method of forming a hybrid metal composite structure comprises forming at least one metal ply. Forming the at least one metal ply comprises forming at least one perforation in the at least one metal ply, abrasively blasting at least one surface of the at least one metal ply to coarsen the at least one surface of the at least one metal ply, and exposing the at least one metal ply to at least one of an acid or a base. The method further comprises disposing at least one fiber composite material structure adjacent the at least one metal ply.

In additional embodiments, a method of forming a portion of a rocket case comprises forming at least one hybrid metal composite structure. Forming the at least one hybrid metal composite structure comprises forming at least one perforation in at least one metal ply, abrasively blasting at least one surface of the at least one metal ply, and forming a coating comprising at least one of a silane coupling agent or a polymeric material on surfaces of the at least one metal ply. The method further comprises incorporating the at least one metal ply between layers of a fiber composite material structure and operably coupling the at least one hybrid metal composite structure to at least another hybrid metal composite structure, the at least another hybrid metal composite structure comprising at least another metal ply.

In further embodiments, a hybrid metal composite structure comprises a plurality of layers, each layer comprising a fiber composite material structure including a fiber material dispersed within a matrix material, the matrix material comprising an epoxy, and at least one layer of the plurality of layers comprising at least one metal ply surrounded by the fiber composite material on all sides thereof, the at least one metal ply having a surface roughness from about 0.5 μm $R_a$ to about 4.0 μm (about 150 μinch) $R_a$ and comprising outer surfaces comprising at least one of a silane coupling agent or a polymeric material chemically bonded to the epoxy.

DETAILED DESCRIPTION

Figure 1:
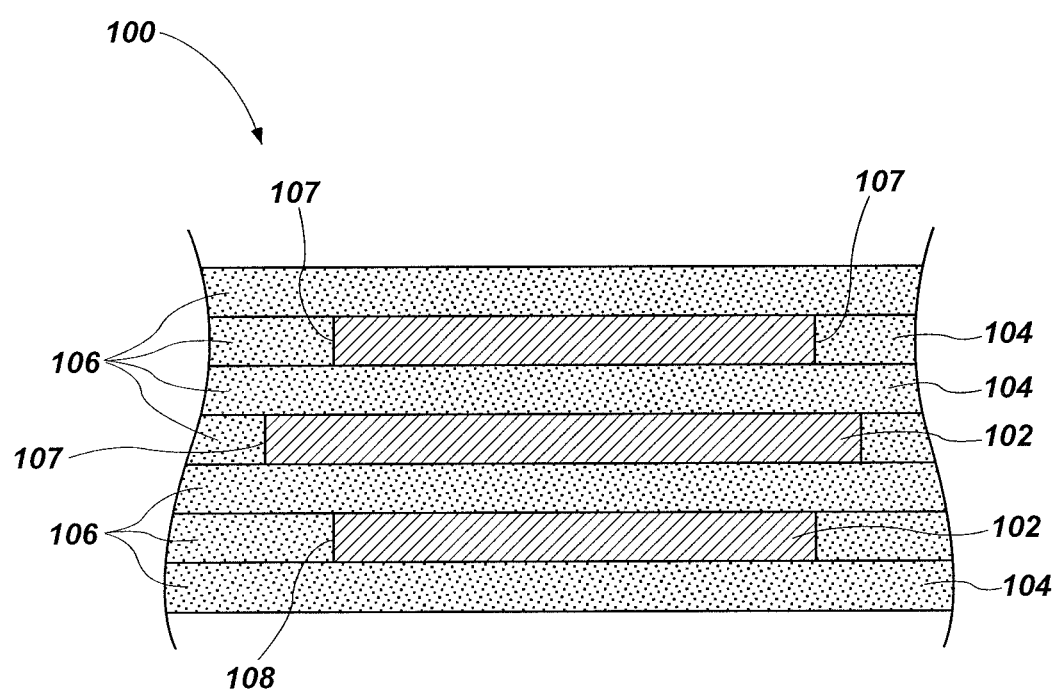
FIG. 1 is a cross-sectional view of a hybrid metal composite structure, according to embodiments of the disclosure.

The illustrations included herewith are not meant to be actual views of any particular systems or hybrid metal composite structures, but are merely idealized representations that are employed to describe embodiments herein. Elements and features common between figures may retain the same numerical designation except that, for ease of following the description, for the most part, reference numerals begin with the number of the drawing on which the elements are introduced or most fully described.

The following description provides specific details, such as material types, material thicknesses, and processing conditions in order to provide a thorough description of embodiments described herein. However, a person of ordinary skill in the art will understand that the embodiments disclosed herein may be practiced without employing these specific details. Indeed, the embodiments may be practiced in conjunction with conventional fabrication techniques employed in the composite industry. In addition, the description provided herein does not form a complete description of a hybrid metal composite structure or a complete process flow for processing a metal ply to be used in hybrid metal composite structures and the structures described below may not necessarily form a complete hybrid metal composite structure. Only those process acts and structures necessary to understand the embodiments described herein are described in detail below. Additional acts to form a complete hybrid metal composite structure including the structures described herein may be performed by conventional techniques.

According to embodiments disclosed herein, a hybrid metal composite (HMC) structure may include one or more metal plies (e.g., metal sheets) disposed in a fiber composite material structure, such as a carbon fiber composite (CFC) material structure. The metal plies may be disposed in the hybrid metal composite structure proximate locations of the hybrid metal composite structure that will be coupled to, for example, another hybrid metal composite structure. In some embodiments, portions of the hybrid metal composite structure that are not located proximate locations coupled to another structure may be substantially free of the metal plies. One or more surfaces (e.g., major surfaces) of each metal ply of the metal plies may be mechanically treated, chemically treated, or both to facilitate improved adhesion of the metal plies to the fiber composite material structure. By way of nonlimiting example, surfaces of the metal plies may be prepared by one or more of cleaning, abrasive blasting, forming perforations therein, exposing surfaces thereof to one or both of an acid or a base, etching, or protecting surfaces thereof with one or more coating materials. The metal plies may be incorporated into the fiber composite material structure to form the hybrid metal composite structure. Metal plies having surfaces as described herein may exhibit improved adhesion to fiber composite material structures. Accordingly, a likelihood of delamination of the metal plies from the fiber composite material structure may be substantially reduced. Hybrid metal composite structures formed according to the methods described herein may exhibit an improved strength (e.g., shear stress), at locations including the metal plies.

FIG. 1 is a cross-sectional view of a hybrid metal composite (HMC) structure 100, according to embodiments of the disclosure. The hybrid metal composite structure 100 includes one or more metal plies (or metal sheets) 102 disposed in a fiber composite material structure 104. The metal plies 102 may be substantially surrounded on all sides thereof with the fiber composite material structure 104. In some embodiments, surfaces of the metal plies 102 may adhere (e.g., chemically bond) to a matrix material of the fiber composite material structure 104.

The hybrid metal composite structure 100 may comprise a plurality of layers 106, each of the layers 106 including the fiber composite material structure 104. For example, a first, lower layer 106 may comprise or consist essentially of the fiber composite material structure 104. A second layer 106, over the first layer 106 may comprise at least one metal ply 102 and the fiber composite material structure 104. The at least one metal ply 102 may be substantially surrounded by the fiber composite material structure 104. A third layer 106 overlying the at least one metal ply 102 of the second layer 106 may comprise or consist essentially of the fiber composite material structure 104, which may substantially surround exposed surfaces of the at least one metal ply 102. Although FIG. 1 illustrates seven layers 106, the hybrid metal composite structure 100 may include any number of layers (e.g., three, four, five, six, eight, nine, etc.). For example, in some embodiments, the hybrid metal composite structure 100 may include greater than or equal to nine (9) layers 106, greater than or equal fifteen (15) layers 106, greater than or equal to twenty-five (25) layers 106, or greater than or equal to fifty (50) layers 106. In other embodiments, the hybrid metal composite structure 100 may include less than or equal to five (5) layers 106 or less than or equal to three (3) layers 106.

In some embodiments, alternating layers 106 may comprise at least one metal ply 102, with intervening layers 106 comprising or consisting essentially of the fiber composite material structure 104 and not including (e.g., free of) at least one of the metal plies 102. Accordingly, in some embodiments, every other layer 106 may include at least one metal ply 102. However, the disclosure is not so limited and the hybrid metal composite structure 100 may include any number of layers 106 intervening between layers 106 including at least one metal ply 102. By way of nonlimiting example, two, three, four, or more layers 106 without a metal ply 102 may intervene between two layers 106 comprising at least one metal ply 102.

In some embodiments, lateral edges 107 (e.g., sidewalls) of the metal ply 102 in one layer 106 may be laterally offset from lateral edges 107 of a metal ply 102 in at least another layer 106. In some embodiments, it is contemplated that the layers 106 may each include at least one metal ply 102 laterally offset from a metal ply 102 in an adjacent layer 106 such that the metal plies 102 are substantially surrounded by the fiber composite material structure 104 and do not include any overlapping surfaces.

The fiber composite material structure 104 may be independently formed of and include fibers and a matrix material. The fibers may be at least partially (e.g., substantially) surrounded (e.g., enveloped) by the matrix material. In some embodiments, the fiber composite material structure 104 comprises reinforcing fiber materials dispersed within a matrix material. The fiber composite material structure 104 may comprise a fiber preform (e.g., a carbon fiber preform) infiltrated with a matrix material. As used herein, the term "fiber preform" means and includes a structure formed of and including fibers. The fiber preform may comprise a single tow of fibers (e.g., a substantially unidirectional bundle of fibers), a tape of multiple tows of the fibers stitched together using another material, such as a glass material), or a woven fabric of multiple tows of the fiber (e.g., a plain weave of the multiple tows, a 4-harness satin weave of the multiple tows, a 5-harness satin weave of multiple tows, an 8-harness satin weave of the multiple tows, etc.). In some embodiments, at least some of the fibers are provided as a 12 k fiber tow (i.e., a bundle of about 12,000 fibers). The fiber preform may have any dimension (e.g., length, width, thickness) compatible with an apparatus or method of forming the hybrid metal composite structure 100. In other embodiments, the fiber composite material structure 104 comprises a filament wound fiber composite material (such as a composite material faulted by wet winding or dry winding), a pre-preg fiber composite material, a fiber mesh, a cloth comprising the fiber material (such as a pre-preg fiber material), or combinations thereof.

The fibers may be formed of and include any material(s) compatible with the other components (e.g., the matrix material of the fiber composite material structure 104, the metal plies 102, etc.) of the hybrid metal composite structure 100. As used herein, the term "compatible" means and includes a material that does not react with, break down, or absorb another material in an unintended way, and that also does not impair the chemical and/or mechanical properties of the another material in an unintended way. By way of nonlimiting example, the fibers may be formed of and include one or more of carbon fibers, ceramic fibers (e.g., oxide-based ceramic fibers, such as one or more of alumina fibers, alumina-silica fibers, and alumina-boria-silica fibers; non-oxide-based ceramic fibers, such as one or more of silicon carbide (SiC) fibers, silicon nitride (SiN) fibers, fibers including SiC on a carbon core, SiC fibers containing titanium, silicon oxycarbide fibers, silicon oxycarbonitride fibers; etc.), polymeric fibers (e.g., thermoplastic fibers, such as one or more of polyethylene (PE) fibers, polypropylene (PP) fibers, polystyrene (PS) fibers, polyvinyl chloride (PVC) fibers, poly(methyl methacrylate) (PMMA) fibers, polycarbonate (PC) fibers, polyphenylene oxide (PPO) fibers, polyetherketone (PEK) fibers, polyetheretherketone (PEEK) fibers, polyaryletherketone (PAEK) fibers, polyetherketoneketone (PEKK) fibers, polyetherketoneetherketoneketone (PEKEKK) fibers, polyether sulfone (PES) fibers, polyphenylene sulfide (PPS) fibers, polyphenylsulfone (PPSU) fibers, self-reinforced polyphenylene (SRP) fibers, aromatic polyamide (PA) fibers, and polyamideimide (PAI) fibers; thermoset plastic fibers, such as one or more of polyimide (PI) fibers, polyurethane (PU) fibers, phenol-formaldehyde fibers, urea-formaldehyde fibers, polyester fibers; etc.), glass fibers, boron fibers, and other fibers. A material composition of the fibers of each of the fiber composite material structures 104 may be selected relative to a material composition of the matrix material of each of the fiber composite material structures 104, as described further detail below. In some embodiments, the fibers of one or more of the fiber composite material structures 104 comprise carbon fibers. In other embodiments, the fiber comprises more than one type of material (e.g., carbon fibers and at least another type of fiber material). In some such embodiments, adjacent layers 106 may comprise fiber composite material structures 104 comprising different fiber materials.

The fibers may constitute from about 10 volume percent (vol %) to about 90 volume percent of the fiber composite material structure 104, such as from about 25 volume percent and about 75 volume percent, or from about 40 volume percent and about 60 volume percent of the fiber composite material structure 104.

The fibers may have any desired dimensions (e.g., lengths, widths, thicknesses) compatible with a desired end use of the hybrid metal composite structure 100. In some embodiments, the fiber material comprises intermediate modulus fibers, such as intermediate modulus carbon fibers, meaning that the fibers have a tensile moduli within a range of from about 200 Gigapascals (GPa) to about 350 GPa (e.g., within a range of from about 275 GPa to about 350 GPa). In some embodiments, the fibers exhibit a tensile modulus of about 350 GPa. In other embodiments, the fibers exhibit a tensile modulus of about 275 GPa. Each of the fibers may independently have a diameter within a range of from about 1 μm to about 100 μm (e.g., from about 1 μm to about 5 μm, from about 5 μm to about 10 μm, from about 10 μm to about 50 μm, from about 50 μm to about 100 μm, etc.). In some embodiments, at least some of the fibers are provided as an intermediate modulus 12 k fiber tow (i.e., a bundle of about 12,000 fibers), such as an intermediate modulus 12 k carbon fiber tow. Suitable intermediate modulus 12 k fiber tows are commercially available from numerous sources, such as from Hexcel Corporation of Stamford, Conn. under the HEXTOW® trade name (e.g., HEXTOW® IM7 Carbon Fiber).

The matrix material may be formed of and include any material(s) compatible with the other components (e.g., the fibers of the fiber composite material structure 104, the metal plies 102, etc.) of the hybrid metal composite structure 100. The matrix material of each fiber composite material structure 104 may be selected relative to the fibers of the respective fiber composite material structure 104 to impart the fiber composite material structure 104 with desirable mechanical properties. By way of nonlimiting example, the matrix material may be formed of and include one or more of a polymer-derived ceramic material or a ceramic material (e.g., an oxide ceramic material, such as one or more of an alumina material, an alumina-silica material, an alumina-boria-silica material, a zirconia material, etc.; a non-oxide ceramic material, such as one or more of a SiC material, a SiN material, a silicon hexaboride material, an aluminum nitride material, a boron nitride material, a boron carbide material, a titanium boride material, a titanium carbide material, and a hafnium carbide material), a polymeric material (e.g., an epoxy material; a thermoplastic polymer material, such as one of more of a PE material, a PP material, a PS material, a PVC material, a PMMA material, a PC material, a PPO material, a PEK material, a PEEK material, a PAEK material, a PEKK material, a PEKEKK material, a PES material, a PPS material, a PPSU material, a polyphenylene material, a PA material, and a PAI material; thermoset plastic material, such as one or more of a PI material, a PU material, a phenol-formaldehyde material, a urea-formaldehyde material, and a polyester material), a glass material, a carbon-containing material, a boron-containing material, or other thermoplastic or thermosetting materials. In some embodiments, the matrix material comprises an epoxy material.

In some embodiments, the matrix material may constitute from about 10 volume percent to about 90 volume percent of the fiber composite material structure 104, such as from about 25 volume percent to about 75 volume percent, or from about 40 volume percent to about 60 volume percent of the fiber composite material structure 104.

Each of the layers 106 (and, therefore, each of the fiber composite material structures 104) may independently include any desired thickness (e.g., height), such as a thickness less than or equal to about 0.030 inch (about 762 micrometers (μm)) (e.g., less than or equal to about 0.020 inch (about 508 μm), less than or equal to about 0.015 inch (about 381 μm), less than or equal to about 0.005 inch (about 127 μm), less than or equal to about 0.003 inch (about 76.2 μm), less than or equal to about 0.001 inch (about 25.4 μm); etc.). In layers 106 including at least one fiber composite material structure 104 and at least one metal ply 102, the thickness of the fiber composite material structure 104 may correspond to (e.g., be the same as) a thickness of the metal ply 102.

The fiber composite material structures 104 in each layer 106 may have substantially the same material composition and thickness, or at least one of the fiber composite material structures 104 may have one or more of a different material composition and a different thickness than at least one other of the fiber composite material structures 104. In some embodiments, each of the fiber composite material structures 104 has substantially the same material composition and thickness as each other of the fiber composite material structures 104. In other embodiments, each of the fiber composite material structures 104 exhibits substantially the same material composition, but at least one of the fiber composite material structures 104 exhibits a different thickness than at least one other fiber composite material structure 104. In further embodiments, each of the fiber composite material structures 104 exhibits substantially the same thickness, but at least one fiber composite material structure 104 exhibits a different material composition than at least one other fiber composite material structure 104. In yet further embodiments, one or more (e.g., each) of the fiber composite material structures 104 exhibits a different material composition and a different thickness than one or more (e.g., each) other of the fiber composite material structures 104.

With continued reference to FIG. 1, each of the metal plies 102 may independently be formed of an include a metal-containing material capable of imparting the hybrid metal composite structure 100 with enhanced strength and structural integrity as compared to composite material structures not including the perforated metal plies 102. For example, each of the metal plies 102 may independently be formed of and include iron (Fe), cobalt (Co), nickel (Ni), copper (Cu), aluminum (Al), magnesium (Mg), titanium (Ti), tungsten (W), molybdenum (Mo), niobium (Nb), vanadium (V), hafnium (Hf), tantalum (Ta), chromium (Cr), zirconium (Zr), silicon (Si), alloys thereof, carbides thereof, nitrides thereof, oxides thereof, or combinations thereof. As a non-limiting example, one or more (e.g., each) of the metal plies 102 may be formed of and include a metal alloy, such as one or more of an Fe-containing alloy, a Ni-containing alloy, a Co-containing alloy, an Fe- and Ni-containing alloy, a Co- and Ni-containing alloy, an Fe- and Co-containing alloy, an Al-containing alloy, a Cu-containing alloy, a Mg-containing alloy, and a Ti-containing alloy. In some embodiments, one or more (e.g., each) of the metal plies 102 are formed of and include elemental Ti. In additional embodiments, one or more (e.g., each) of the metal plies 102 are formed of and include an Fe-containing alloy (e.g., a steel-alloy, such as a stainless steel, a mild steel, etc.). Each of the metal plies 102 may have substantially the same material composition, or at least one of the metal plies 102 may have a different material composition than at least one other of the metal plies 102.

The metal plies 102 may have material properties (e.g., mechanical properties, rheological properties, physical properties, chemical properties, etc.) substantially compatible with material properties of the fiber composite material structures 104. By way of nonlimiting example, one or more of the metal plies 102 may independently have one or more of a coefficient of thermal expansion, an elastic (e.g., Young's) modulus, a bulk modulus, a tensile strength, a hardness, a thermal resistance, an abrasion resistance, and a chemical resistance substantially similar to that of one or more of the fibers and the matrix material of one or more (e.g., each) of the fiber composite material structures 104. In some embodiments, each of the metal plies 102 has a coefficient of thermal expansion within a range of from about $3 \times 10^{-6}$/K to about $25 \times 10^{-6}$/K at about 25° C., and a coefficient of thermal expansion of the matrix material of each of the fiber composite material structures 104 may be within a range of from about $3 \times 10^{-6}$/K to about $150 \times 10^{-6}$/K at about 25° C., such as from about $20 \times 10^{-6}$/K to about $150 \times 10^{-6}$/K, or from about $45 \times 10^{-6}$/K to about $65 \times 10^{-6}$/K at about 25° C.

The hybrid metal composite structure 100 may include any number of metal plies 102. For clarity and ease of understanding of the drawings and related description, FIG. 1 shows the hybrid metal composite structure 100 as including three (3) metal plies 102. However, the hybrid metal composite structure 100 may include a different number of metal plies. For example, in additional embodiments, the hybrid metal composite structure 100 may include greater than three (3) metal plies 102 (e.g., greater than or equal to five (5) metal plies 102, greater than or equal to nine (9) metal plies 102, greater than or equal to fifteen (15) metal plies 102, greater than or equal to twenty-five (25) metal plies). In other embodiments, the hybrid metal composite structure 100 may include less than three (3) metal plies 102 (e.g., less than two (2) metal plies 102, or only one (1) metal ply 102). The metal plies 102 may constitute from about 1 volume percent and about 50 volume percent of the hybrid metal composite structure 100, such as from about 5 volume percent and about 40 volume percent, or from about 10 volume percent and about 35 volume percent of the hybrid metal composite structure 100.

Each of the metal plies 102 may independently exhibit any desired peripheral dimensions (e.g., width, length, and height) permitting the metal plies 102 to enhance the strength and mechanical (e.g., structural) integrity of a region (e.g., an area, a portion) of the hybrid metal composite structure 100 including the metal plies 102 as compared to another region of the hybrid metal composite structure 100 not including the metal plies 102. Each of the metal plies may independently exhibit a thickness (e.g., a height) less than or equal to about 0.050 inch (about 1270 micrometers (μm)), such as within a range of from about 0.001 inch (about 25.4 μm) to about 0.030 inch (about 762 μm), such as from about 0.003 inch (about 76.2 μm) to about 0.020 inch (about 508 µm), or from 0.005 inch (about 127 µm) to about 0.015 inch (about 381 µm). In some embodiments, one or more of the metal plies 102 exhibits a thickness of about 0.01 inch (about 254 µm). Each of the metal plies 102 may exhibit substantially the same peripheral dimensions (e.g., substantially the same width, substantially the same length, and substantially the same height), or at least one of the metal plies 102 may exhibit one or more different peripheral dimensions (e.g., a different width, a different length, and/or a different height) than at least one other of the metal plies 102. As shown in FIG. 1, a lateral width (i.e., a distance between lateral edges 107)) of the metal ply 102 in one of the layers 106 may be different from a width of a metal ply 102 in another layer 106. In additional embodiments, each of the metal plies 102 in each layer 106 may exhibit substantially the same lateral width.

As shown in FIG. 1, metal plies 102 in different layers 106 than one another may be substantially aligned with each other. In some embodiments, the lateral edges 107 of the metal plies 102 in different levels of layers 106 may be laterally offset from each other. In other embodiments, one or more of the metal plies 102 may be unaligned with one or more of the metal plies in different levels of layers 106, and/or each of the metal plies 102 may exhibit lateral edges 107 substantially coplanar with lateral edges 107 of each of the other metal plies 102.

Each of the metal plies 102 may independently exhibit any peripheral shape compatible with a desired end use of the hybrid metal composite structure 100. By way of non-limiting example, the metal plies 102 may exhibit one or more of rectangular peripheral shapes, square peripheral shapes, trapezoidal peripheral shapes, annular peripheral shapes, circular peripheral shapes, semicircular peripheral shapes, crescent peripheral shapes, ovular peripheral shapes, astroidal peripheral shapes, deltoidal peripheral shapes, ellipsoidal peripheral shapes, triangular peripheral shapes, parallelogram peripheral shapes, kite peripheral shapes, rhomboidal peripheral shapes, pentagonal peripheral shapes, hexagonal peripheral shapes, heptagonal peripheral shapes, octagonal peripheral shapes, enneagonal peripheral shapes, decagonal peripheral shapes, truncated versions thereof, and irregular peripheral shapes. In some embodiments, one or more (e.g., each) of the metal plies 102 exhibits a generally rectangular peripheral shape. Each of the metal plies 102 may exhibit substantially the same peripheral shape, or at least one of the metal plies 102 may exhibit a different peripheral shape than at least one other of the metal plies 102.

Figure 2:
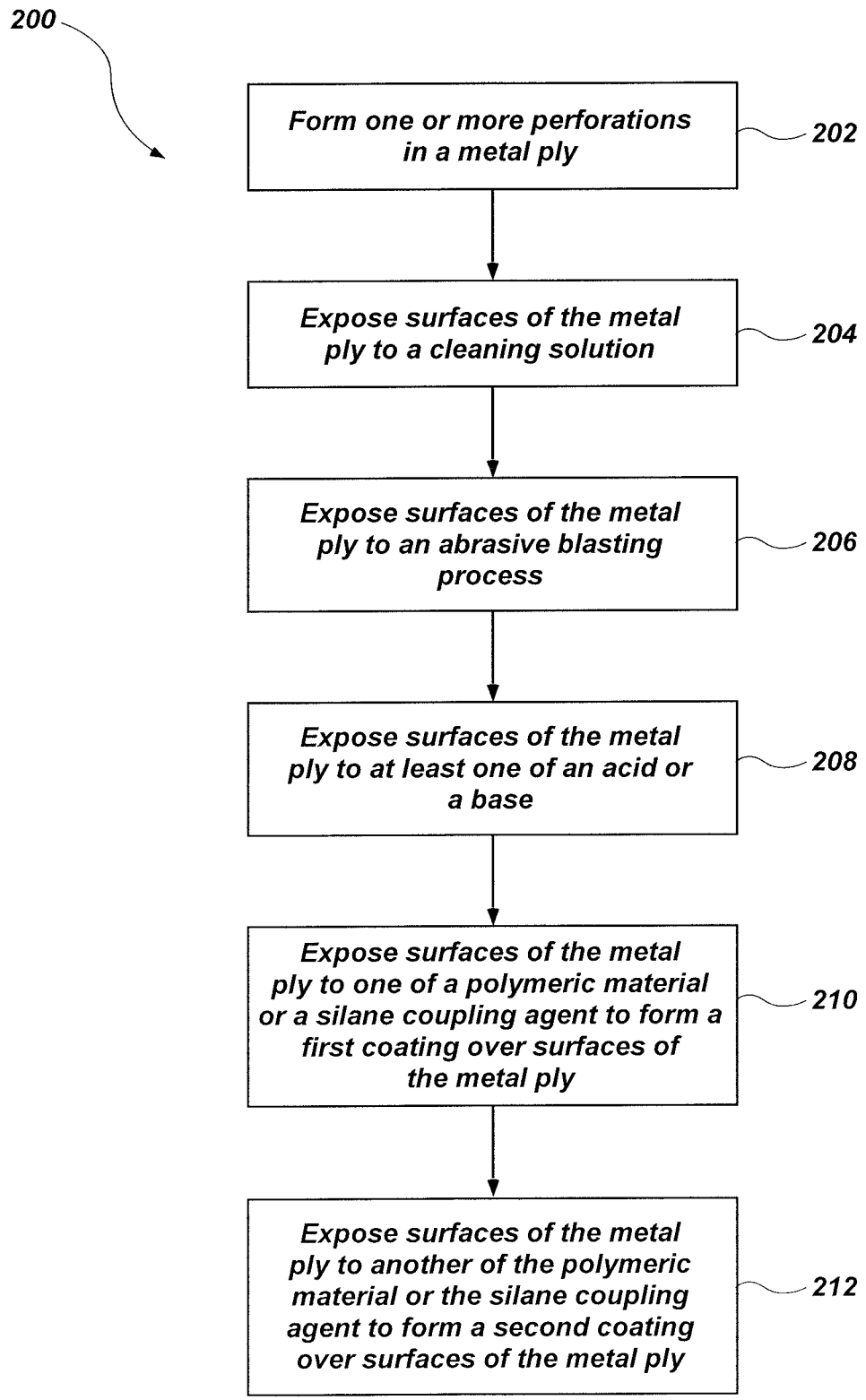
FIG. 2 is a simplified flow diagram illustrating a method of forming a metal ply, according to embodiments of the disclosure.

Substantially all surfaces of each of the metal plies 102 may be surrounded by the fiber composite material structure 104. At least one surface of the metal ply 102 may be treated to facilitate adhesion between the metal ply 102 and the fiber composite material structure 104. In some embodiments, surfaces of the metal plies 102 may be chemically bonded to the matrix material of the fiber composite material structure 104. FIG. 2 is a simplified flow diagram illustrating a method 200 of forming a metal ply 102. The method 200 may include act 202 including forming one or more perforations in the metal ply, act 204 including exposing surfaces of the metal ply to a cleaning solution; act 206 including exposing surfaces of the metal ply to an abrasive blasting process; act 208 including exposing surfaces of the metal ply to at least one of an acid or a base; act 210 including exposing surfaces of the metal ply to one of a polymeric material or a silane coupling agent to faun a first coating over surfaces of the metal ply; and act 212 including exposing surfaces of the metal ply to another of the polymeric material or the silane coupling agent to form a second coating over surfaces of the metal ply 102.

Act 202 includes forming one or more perforations in the metal ply. The perforations may be formed in the metal ply in one or more patterns, shapes, sizes, and configurations as described in U.S. patent application Ser. No. 15/250,536, filed Aug. 29, 2016, and entitled "HYBRID METAL COMPOSITE STRUCTURES, ROCKET MOTORS AND MULTI-STAGE ROCKET MOTOR ASSEMBLIES INCLUDING HYBRID METAL COMPOSITE STRUCTURES, AND RELATED METHODS," the disclosure of which is hereby incorporated herein it its entirety by this reference.

Act 204 includes exposing surfaces of the metal ply to a cleaning solution. Exposing surfaces of the metal ply to the cleaning solution may substantially remove contaminants such as lubricants, finger oils, etc., from surfaces thereof.

The cleaning solution may be applied to surfaces of the metal ply by one or more of brushing, wiping, or spraying the cleaning solution over surfaces of the metal ply, dip-coating the metal ply in the cleaning solution, or exposing the surfaces of the metal ply to an ultrasonic bath including the cleaning solution. In some embodiments, surfaces of the metal ply are wiped with the cleaning solution and rinsed. In other embodiments, the metal ply is dip-coated in a bath including the cleaning solution.

The cleaning solution may comprise one or both of a surfactant or an organic solvent. Nonlimiting examples of surfactants include soaps (e.g., glycerine soaps, transparent soaps, liquid soaps, etc.), a cleaning detergent (e.g., an anionic detergent, a non-ionic detergent, a cationic detergent, an amphoteric detergent, an alkaline detergent, a caustic material, an acid cleaner, etc.), fatty alcohol ethoxylates, sodium stearate, or other surfactants. Nonlimiting examples of organic solvents include organic solvents exhibiting a high vapor pressure configured and formulated to remove oils and contaminants from surfaces of the metal ply. In some embodiments, the organic solvent may include one or more of acetone, fluoro solvents (e.g., hydrofluorocarbons (HFC), hydrofluoroethers (HFE), etc.), trichloroethylene (TCE), tetrachloroethylene, hydrochloric acid, bleach, a degreaser, or another solvent.

Act 206 includes exposing surfaces of the metal ply to an abrasive blasting process (e.g., grit blasting, sand blasting (also referred to as bead blasting), hydro-blasting, etc.). In some embodiments, act 206 includes grit blasting at least one surface of the metal ply. Abrasive blasting the metal ply may include forcibly propelling a stream of an abrasive material (also referred to as an abrasive media) against the at least one surface of the metal ply to physically alter the at least one surface thereof. The stream of abrasive material may be propelled with compressed air, water, a centrifugal wheel, or by any other suitable means. In some embodiments, the abrasive material is propelled with compressed air.

The abrasive material may include one or more of sand (e.g., silica sand), alumina, silicon carbide, emery (a mixture of corundum (aluminum oxide) and magnetite ($Fe_3O_4$)), garnet, magnesium sulphate (e.g., kieserite), steel shot, steel grit, stainless steel shot, aluminum shot, zinc shot, or other abrasive media. In some embodiments, such as where the metal ply comprises titanium, the abrasive material may comprise alumina. In embodiments where the metal ply comprises a steel material, the abrasive material may comprise alumina or steel shot. In some embodiments, the metal ply may be exposed to more than one type of media.

The abrasive material may comprise a plurality of particles which may be spherical, cylindrical, platelet, angular, arcuate, flake, or any other shape. In some embodiments, the abrasive material comprises spherical particles. The spherical particles may have a mean size (e.g., a mean diameter) from about 120 mesh to about 80 mesh, such as from about 110 mesh to about 90 mesh (e.g., from about 0.125 mm to about 0.180 mm, such as from about 0.138 mm to about 0.165 mm). In some embodiments, the spherical particles may have a mean size of about 100 mesh (about 0.150 mm).

Exposing the metal ply to the abrasive blasting process may roughen (e.g., coarsen) surfaces of the metal ply exposed to the abrasive blasting process and increase a surface roughness thereof. The surface roughness (e.g., an arithmetic mean roughness value ($R_a$)) of the metal ply may be from about 0.5 μm $R_a$ to about 4.0 pin $R_a$, such as from about 1 μm $R_a$ to about 3 μm $R_a$, or from about 1.5 μm $R_a$ to about 2.5 μm $R_a$. A size of the abrasive material may be selected to provide a desired surface roughness to the exposed surfaces of the metal ply.

Figure 3A:
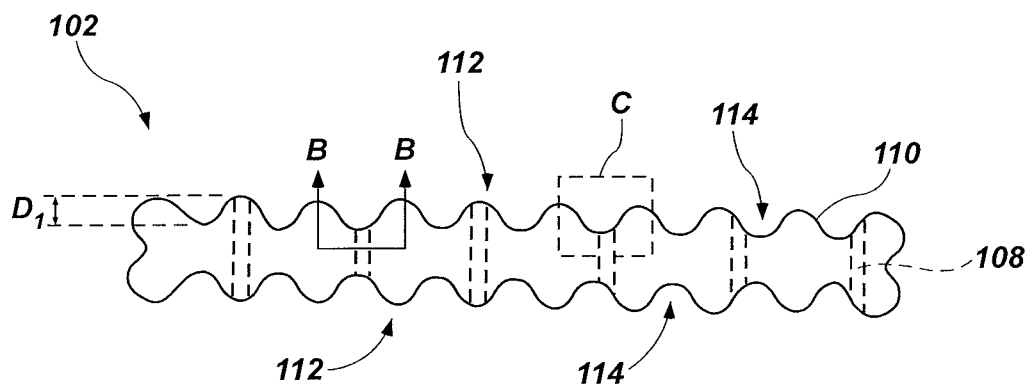
FIG. 3A is a cross-sectional side view of a metal ply, according to embodiments of the disclosure.

FIG. 3A is a cross-sectional side view of a metal ply 102 after surfaces 110 thereof have been exposed to an abrasive blasting process. As described above and as described in U.S. patent application Ser. No. 15/250,536, filed Aug. 29, 2016, the metal ply 102 may include one or more perforations 108 extending therethrough. The perforations 108 may extend from a first major surface of the metal ply 102 to an opposing, second major surface thereof.

The metal ply 102 may include a plurality of peaks 112 and a plurality of valleys 114, each valley 114 being disposed between adjacent peaks 112. The plurality of peaks 112 and valleys 114 may impart a degree of roughness to the surfaces 110 of the metal ply 102, the roughness being greatly exaggerated in FIG. 3A for illustration purposes. Exposing the surfaces 110 of the metal ply 102 to the abrasive blasting process may form the valleys 114. A depth $D_1$ of the valleys 114 may depend, at least in part, on a size of the abrasive media used during the abrasive blasting process, a velocity at which the abrasive media contacts the surfaces of the metal ply 102, and a duration that the metal surfaces are exposed to the abrasive media. The location and spacing between adjacent peaks 112 or between adjacent valleys 114 may be substantially random.

Figure 3B:
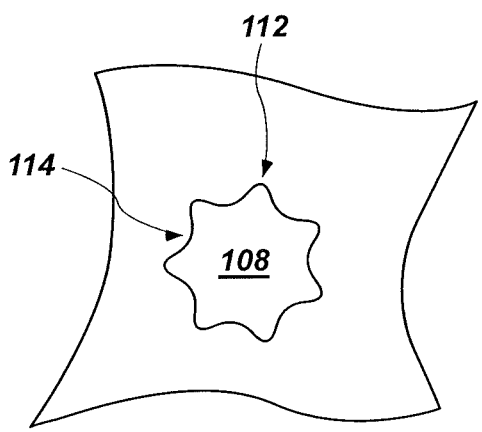
FIG. 3B is a plan view of a portion of the metal ply of FIG. 1 taken along sectional line B-B of FIG. 3A.

In some embodiments, at least some of the perforations 108 may be located proximate a peak 112 and at least some of the perforations 108 may be located proximate a valley 114. In other words, the peaks 112 and valleys 114 may be randomly dispersed with relation to a location of the perforations 108. In some embodiments, at least a portion of inside surfaces of the perforations may include peaks 112 and valleys 114. For example, FIG. 3B illustrates a plan view of a portion of the metal ply 102 taken along sectional line B-B of FIG. 3A. Surfaces defining the perforation 108 may include a plurality of peaks 112 and a plurality valleys 114. Accordingly, at least a portion of inside surfaces of the perforations 108 may exhibit a roughness, such as a roughness from about 0.5 μm $R_a$ to about 4.0 μm $R_a$.

Act 208 includes exposing surfaces of the metal ply to at least one of acid or a base to chemically activate exposed surfaces of the metal ply. Surfaces of the metal ply may be exposed to one or more of an acid or a base such as by one or more of dip-coating, spraying, brushing, or another method of applying the acid or base to the surface of the metal ply. In some embodiments, the metal ply is dip-coated in the acid or the base. The metal ply may be exposed to the acid or the base for from about 5 minutes and about 30 minutes, such as about 10 minutes.

Exposing the metal ply to an acid may remove oxides and other materials from surfaces of the metal ply to form an exposed metal surface comprising an elemental metal. In some embodiments, forming an exposed metal may activate surfaces of the metal ply for chemically reacting (e.g., bonding) with another material, such as an organic material, a coupling agent, or both, as will be described herein. In some embodiments, exposing surfaces of the metal ply to an acid may remove (e.g., etch) material from surfaces of the metal ply and at least partially roughen the exposed surfaces.

Exposing the metal ply to a base may form metal oxides on exposed surfaces thereof. In some embodiments, the metal oxides may facilitate chemical bonding between the metal oxide and another material, such as an organic material, a coupling agent, or both. The another material may chemically react with the metal oxide of the metal ply and, for example, a matrix material of a fiber composite material structure. In some embodiments, exposing surfaces of the metal ply to a base may also remove material from surfaces of the metal ply and at least partially roughen the exposed surfaces of the metal ply.

The acid may include sulfuric acid ($H_2SO_4$), nitric acid ($HNO_3$), hydrochloric acid (HCl), hydrofluoric acid (HF), or combinations thereof.

The base may comprise an oxidizing agent. By way of nonlimiting example, the base may comprise one or more hydroxides (e.g., sodium hydroxide (NaOH), potassium hydroxide (KOH)), ammonia ($NH_3$), an ammonium oxidizing agent (e.g., ammonium chlorate ($NH_4ClO_3$), ammonium dichromate (($NH_4)_2Cr_2O_7$), ammonium nitrate ($NH_4NO_3$), ammonium nitrite ($NH_4NO_2$), ammonium perchlorate ($NH_4ClO_4$), ammonium permanganate ($NH_4MnO_4$), ammonium persulfate (($NH_4)_2S_2O_8$), etc.), sodium bicarbonate ($NaHCO_3$), sodium carbonate ($Na_2CO_3$), sodium perborate ($NaBO_3 \cdot H_2O$), hydrogen peroxide ($H_2O_2$), or other oxidizing agent or base. In some embodiments, the base comprises sodium hydroxide.

In some embodiments, the metal ply may be exposed to one of the acid or the base, rinsed, and exposed to the other of the acid or base. The acid or base may be selected based on the composition of the metal ply and a desired reaction between surfaces of the metal ply and the acid or base. By way of nonlimiting example, such as where the metal ply comprises titanium, the metal ply may be exposed to an acid to remove one or more undesired materials from the metal surface and remove (e.g., etch) at least some metal material from the metal ply, rinsed, and exposed to one or more bases to form a metal oxide (e.g., titanium dioxide ($TiO_2$)) on surfaces of the metal ply. It is contemplated that in other embodiments, the metal ply may be exposed to an oxidizing agent, rinsed, and then exposed to an acid depending on the composition of the metal ply.

Figure 3C:
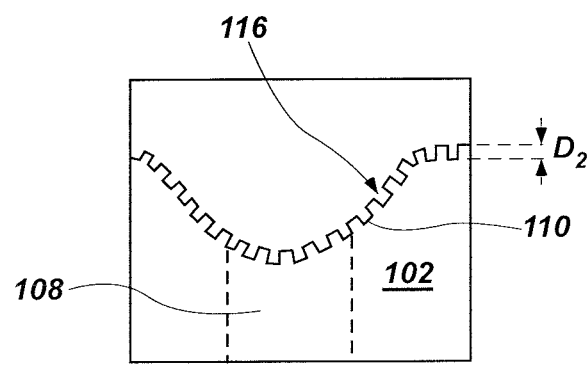
FIG. 3C is a cross-sectional side view illustrating a close-up view of dashed inset box C of FIG. 3A.

FIG. 3C is a cross-sectional side view illustrating a close-up view of dashed inset box C of FIG. 3A. The surface 110 of the metal ply 102 may exhibit a varying topography in the form of, for example, a plurality of indentations 116 (e.g., trenches, cavities, etc.). Stated another way, the surfaces 110 may exhibit an irregular topography. Exposing surfaces 110 of the metal ply 102 to one or both of the acid or the base may form indentation 116 in the surfaces 110 of the metal ply 102. Each indentation 116 may have a depth $D_2$, which may depend at least in part, on an exposure time of the metal ply 102 to the acid or the base. In some embodiments, the depth $D_2$ of the indentation 116 may be less than the depth $D_1$ (FIG. 3A) of the valleys 114 (FIG. 3A). The indentation 116 may facilitate improved adhesion between the metal ply 102 and, for example, the fiber composite material structure 104 (FIG. 1). Accordingly, in some embodiments, exposing the metal ply to at least one of an acid or a base may facilitate improved adhesion between the metal ply and a fiber composite material.

Act 210 may include exposing surfaces of the metal ply to one of a polymeric material or a silane coupling agent to form a first coating over surfaces of the metal ply. The first coating may protect surfaces of the metal ply activated responsive to exposure to the acid or base from undesired reactions (e.g., such as from oxidation, reaction with water, etc.). The polymeric material or the silane coupling agent may be applied to the surfaces of the metal ply by one or more of spraying dip-coating, brushing, or other suitable method. In some embodiments, the metal ply is dip-coated in one of the polymeric material or the silane coupling agent.

The polymeric material may include a phenolic material (e.g., phenol formaldehyde resin (PF), a phenolic primer (e.g., such as those sold under the tradename 3M™ SCOTCHKOTE™ Liquid Phenolic Primer 345 by 3M, of Austin, Tex., or BR® 127 Primer by Cytec Engineered Materials, or Tempe, Ariz.), bisphenol A epoxies, bisphenol F epoxies, phenolic novolac epoxies, etc.), an epoxy material, or a combination thereof.

The silane coupling agent may include aminopropyl trimethoxysilane ($H_2N(CH_2)_3Si(OCH_3)_3$), aminopropyl triethoxysilane ($H_2N(CH_2)_3Si(OC_2H_5)_3$), glycidyloxypropyl trimethoxysilane ($C_9H_{20}O_5Si$), glycidyloxypropyl methyldimethoxysilane ($C_9H_{20}O_4Si$), glycidyloxypropyl triethoxysilane ($C_{12}H_{26}O_5Si$), or other suitable silane coupling agent.

The polymeric material and the silane coupling agent may be configured and formulated to couple the metal ply to an organic material. By way of nonlimiting example, the polymeric material and the silane coupling material may be configured to chemically bond to an elemental metal, a metal oxide, or both on surfaces of the metal ply and to an organic material, such as the fiber composite material structure 104 (FIG. 1) (e.g., to the matrix (e.g., resin) of the fiber composite material structure 104). By way of nonlimiting example, the polymeric material and the silane coupling agent may each include at least one functional group formulated and configured to bond with an organic material (e.g., the matrix of the fiber composite material structure 104) and at least another functional group formulated and configured to bond with an inorganic material (e.g., the surface of the metal ply). Accordingly, the polymeric material and the silane coupling agent may be formulated and configured to couple an organic material (e.g., the fiber composite material structure 104) to the metal ply.

Figure 3D:
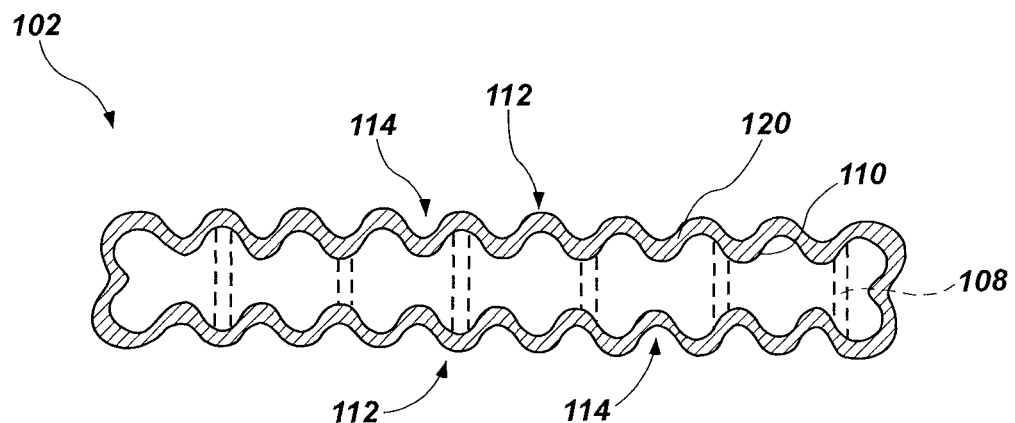
FIG. 3D is a cross-sectional side view of a metal ply including a first coating, according to embodiments of the disclosure.

FIG. 3D illustrates the metal ply 102 after it has been exposed to one of the polymeric material or the silane coupling agent. The metal ply 102 may include a first coating 120 disposed on surfaces 110 thereof. In some embodiments, the first coating 120 conformally overlies the surfaces 110 of the metal ply 102. Accordingly, in some embodiments, the first coating 120 may be disposed on surfaces of the plurality of peaks 112 and surfaces of the plurality of valleys 114.

In embodiments where the first coating 120 comprises the silane coupling agent, the first coating 120 may have a thickness from about one monolayer to about 500 nm, such as from about 1 nm to about 10 nm, from about 10 nm to about 50 nm, from about 50 nm to about 100 nm, or from about 100 nm to about 500 nm. In some embodiments, the first coating 120 comprises a monolayer of the polymeric material or the silane coupling agent. In embodiments where the first coating 120 comprises the polymeric material, the first coating 120 may have a thickness from about 1 µm to about 15 µm, such as from about 1 µm to about 3 µm, from about 3 µm to about 5 µm, from about 5 µm to about 10 µm, or from about 10 µm to about 15 µm. In some such embodiments, the first coating 120 has a thickness from about 3 µm to about 5 µm.

Figure 3E:
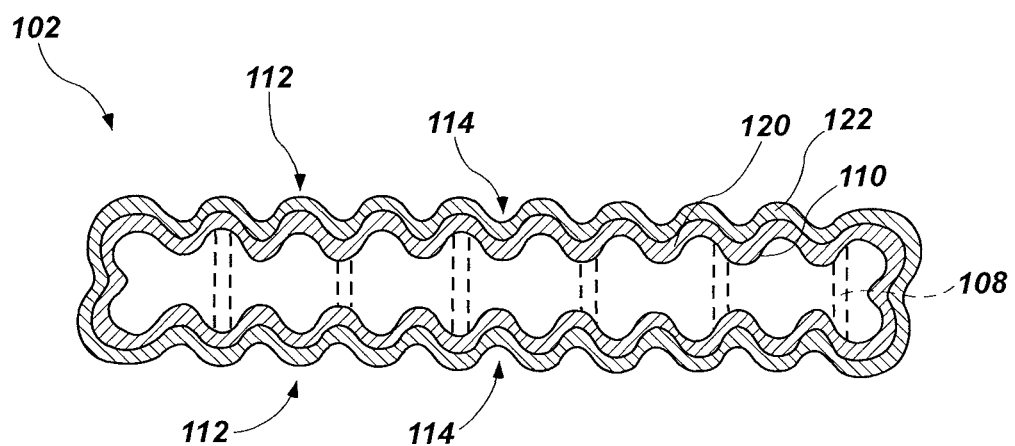
FIG. 3E is a cross-sectional side view of a metal ply including a first coating and a second coating, according to embodiments of the disclosure.

Referring back to FIG. 2, act 212 includes optionally exposing surfaces of the metal ply to another of the polymeric material or the silane coupling agent to form a second coating over surfaces of the metal ply. FIG. 3E illustrates the metal ply 102 including the first coating 120 and a second coating 122 formed thereover.

The first coating 120 may comprise one of the polymeric material or the silane coupling agent and the second coating 122 may comprise the other of the polymeric material or the silane coupling agent. In some embodiments, the first coating 120 comprises the polymeric material and the second coating 122 comprises the silane coupling material. In some such embodiments, the polymeric material may be configured to bond to the metal (e.g., an elemental metal or a metal oxide) of the metal ply 102 and to the silane coupling agent. The silane coupling agent may be configured to bond to the polymeric material and to the fiber composite material structure 104 (FIG. 1).

In other embodiments, the first coating 120 may comprise the silane coupling material and the second coating 122 may comprise the polymeric material. In some such embodiments, the silane coupling material may be configured to bond to the metal (e.g., an elemental metal or a metal oxide) of the metal ply 102 and to the polymeric material. The polymeric material may be configured to bond to the silane coupling agent and to the fiber composite material structure 104 (FIG. 1).

The second coating 122 may be substantially continuous over the first coating 120. In some embodiments, the second coating 122 conformally overlies the first coating 120. In embodiments where the second coating 122 comprises the silane coupling agent, the second coating 122 may have a thickness from about one monolayer to about 500 nm, such as from about 1 nm to about 10 nm, from about 10 nm to about 50 nm, from about 50 nm to about 100 nm, or from about 100 nm to about 500 nm. In other embodiments, such as where the second coating 122 comprises the polymeric material, the second coating 122 may have a thickness from about 1 µm to about 15 µm, such as from about 1 µm to about 3 µm, from about 3 µm to about 5 µm, from about 5 µm to about 10 µm, or from about 10 µm to about 15 µm. In some such embodiments, the first coating 120 has a thickness from about 3 µm to about 5 µm.

Although the method 200 has been described as treating surfaces of a single metal ply material, the disclosure is not so limited. In other embodiments, surfaces of a piece of sheet metal having a surface area corresponding to a surface area of a plurality of metal plies may be treated, such as by forming a plurality of perforations therein, exposing surfaces of the metal sheet to a cleaning solution, exposing the surfaces to an abrasive blasting process, exposing the surfaces to one or more of an acid or a base, and forming one or both of a first coating or a second coating of one or more of a polymeric material or a silane coupling agent on surfaces thereof. The metal sheet may be cut into individual metal plies 102 (FIG. 1) having desired dimensions for use in the hybrid metal composite structure 100 (FIG. 1).

With reference again to FIG. 1, the metal plies 102 may exhibit an improved adhesion to the fiber composite material structure 104 compared to metal plies that do not include one or more of the perforations 108, the peaks 112, the valleys 114, the indentations 116, the first coating 120, or the second coating 122, as described above with reference to FIG. 3A through FIG. 3E. By way of nonlimiting example, the first coating 120 (FIG. 3E) and the second coating 122 (FIG. 3E) may be configured to facilitate improved adhesion between the metal ply 102 and the matrix material of the fiber composite material structure 104. In addition, the surface roughness of the metal ply 102 (e.g., such as that caused by one or more of the peaks 112, the valleys 114, or the indentations 116) may facilitate improved adhesion between the metal ply 102 and the fiber composite material structure 104. Without wishing to be bound by any particular theory, it is believed that the increased surface roughness and increased surface area of the exposed surfaces 110 of the metal ply 102 facilitates improved adhesion between the metal ply 102 and the fiber composite material structure 104. In addition, exposed portions of the first coating 120 or the second coating 122 may include functional groups configured and formulated to chemically react with and faun chemical bonds with the matrix material (e.g., an epoxy resin material).

Figure 4:
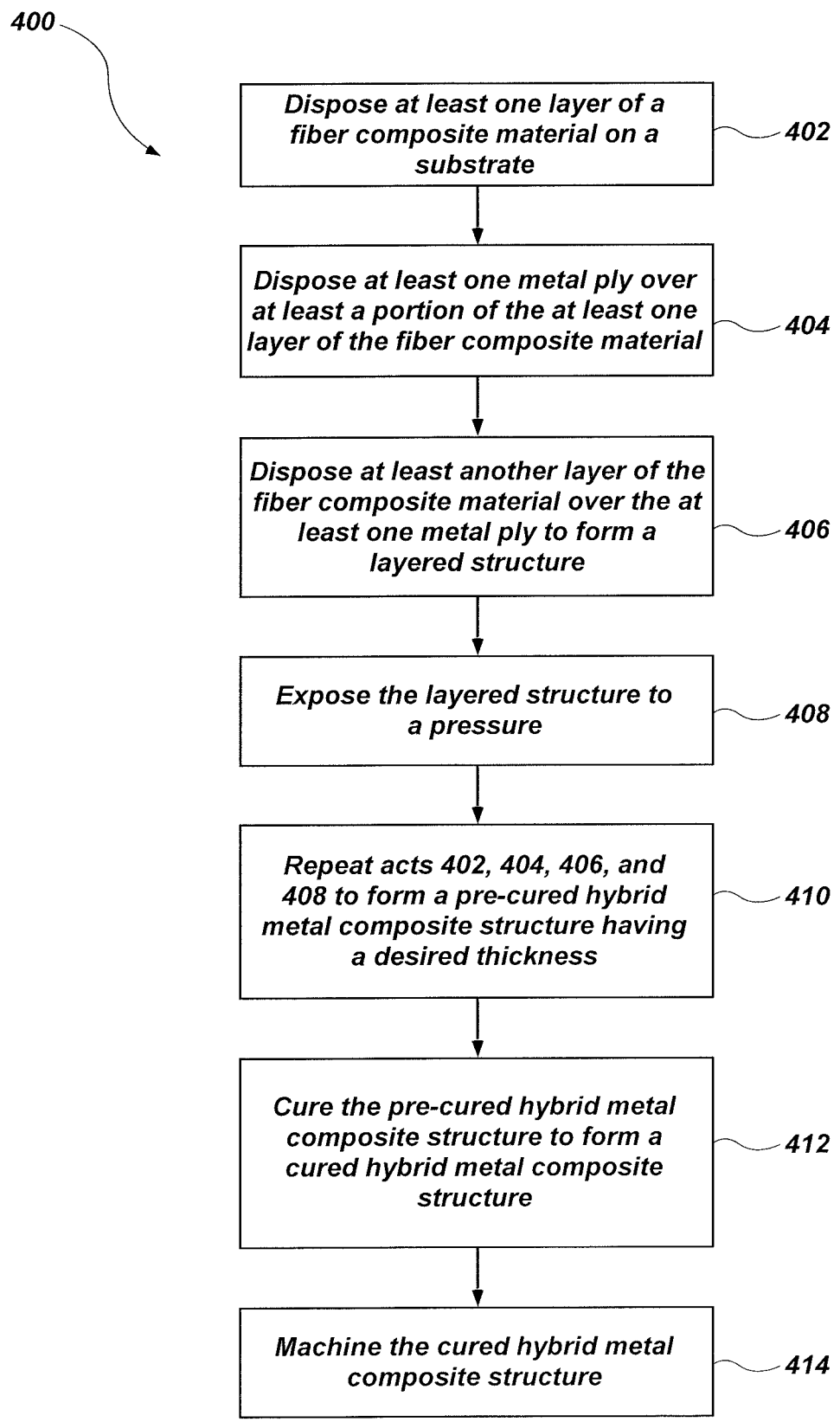
FIG. 4 is a simplified flow diagram illustrating a method of forming the hybrid metal composite structure of FIG. 1, according to embodiments of the disclosure.

Referring to FIG. 4, a simplified flow diagram illustrating a method 400 of faulting the hybrid metal composite structure 100 (FIG. 1) is illustrated. The method 400 may comprise faulting the hybrid metal composite structure 100 by one or more of filament winding, vacuum bag molding, resin transfer molding (RTM), hand placement (lay up), another suitable process, or combinations thereof. Such methods may be known to those of ordinary skill in the art and are, therefore, not described in detail herein.

The method 400 includes act 402 including disposing at least one layer of a fiber composite material (e.g., a fiber composite material structure) on a substrate; act 404 including disposing at least one metal ply over at least a portion of the at least one layer of the fiber composite material; act 406 including disposing at least another layer of the fiber composite material over the at least one metal ply to form a layered structure; act 408 including exposing the layered structure to a pressure; act 410 including repeating acts 402, 404, 406, and 408 to form a pre-cured hybrid metal composite structure having a desired thickness; act 412 including curing the pre-cured hybrid metal composite structure to form a cured hybrid metal composite structure; and act 414 including machining the cured hybrid metal composite structure.

Act 402 includes disposing at least one layer of a fiber composite material (e.g., the fiber composite material structure 104 (FIG. 1)) on a substrate. In some embodiments, a release agent may be applied to surfaces of the substrate prior to disposing the at least one layer of the fiber composite material on the substrate. The at least one layer of the fiber composite material may comprise a fiber tape, a fiber sheet, a woven fiber fabric, or a tow infiltrated (e.g., impregnated) with an uncured matrix material.

The substrate may comprise a mold core (e.g., a mandrel), another fiber composite material, a metal material, a ceramic material, at least a portion of a mold, or another material. The substrate may have any desired shape (e.g., flat, cylindrical, etc.). In some embodiments, the substrate comprises at least a portion of a final structure formed by the method 400 (e.g., a portion of the hybrid metal composite structure 100 (FIG. 1)). In other embodiments, the final structure does not include the substrate.

In some embodiments, such as where the hybrid metal composite structure 100 is formed by filament winding, the substrate may comprise a mandrel (e.g., a rod, tube or other surface of revolution). The fiber composite material may be wound around the mandrel to form a desired shape (e.g., an open cylinder).

In yet other embodiments, the substrate may comprise a substantially flat material on which the fiber composite material is disposed, such as in a lay up process or a vacuum bagging process. In some such embodiments, the at least one layer of the fiber composite material may be disposed on the substrate by hand placement.

Act 404 includes disposing at least one metal ply (e.g., the metal ply 102 (FIG. 1)) over at least a portion of the at least one layer of the fiber composite material. Surfaces of the at least one metal ply may be modified as described above with reference to FIG. 3A through FIG. 3E. The at least one metal ply may be selected to have a thickness equal to about a thickness of the fiber composite material, which may facilitate disposing the at least one metal ply in the hybrid metal composite structure 100 without increasing a thickness of the hybrid metal composite structure 100 at locations of the metal plies 102. For example, and with reference to FIG. 1, the at least one metal ply 102 may be disposed in a layer 106 of the hybrid metal composite structure 100 without increasing a thickness of the hybrid metal composite structure 100 proximate the at least one metal ply 102. Stated another way, the hybrid metal composite structure 100 may exhibit a substantially uniform thickness across a length thereof.

Act 406 includes disposing at least another layer of the fiber composite material (e.g., another fiber composite material structure) over at least a portion of the at least one metal ply to form a layered structure. The at least another layer of the fiber composite material may be disposed over an exposed major surface of the at least one metal ply. The at least another layer of the fiber composite material may overlie and substantially cover exposed surfaces of the at least one metal ply.

Act 408 may include exposing the layered structure to a pressure. In some embodiments, exposing the layered structure to a pressure comprises compressing the layered structure and substantially reducing or eliminating voids therein. In some embodiments, exposing the layered structure to the pressure may increase a packing density of the adjacent layers 106 (FIG. 1) of the fiber composite material (FIG. 1). By way of nonlimiting example, exposing the layered structure to a pressure may remove air, excess resin, or both trapped between adjacent layers 106 to form a substantially compact layered structure substantially free of voids.

Act 410 may include repeating acts 402, 404, 406, and 408 to form a pre-cured hybrid metal composite structure having a desired thickness and including a desired number of metal plies therein. In some embodiments, at least another metal ply may be disposed directly over an underlying metal ply with one or more intervening layers of the fiber composite material. In other embodiments, adjacent metal plies may be laterally offset from one another. Each of the metal plies may comprise the same material or may comprise one or more different materials.

Act 412 includes curing the pre-cured hybrid metal composite structure to form a cured hybrid metal composite structure. In some embodiments, curing the pre-cured hybrid metal composite structure comprises chemically bonding the matrix material of the fiber composite material structure 104 (FIG. 1) to one of the first coating 120 (FIG. 3E) or the second coating 122 (FIG. 3E).

Curing the pre-cured hybrid metal composite structure may include exposing the pre-cured structure to an elevated temperature, such as in an autoclave, a compression mold, or a lamination press. The curing temperature may be from about 20° C. (e.g., about room temperature) to about 300° C., such as from about 20° C. to about 50° C., from about 50° C. to about 100° C., from about 100° C. to about 200° C., or from about 200° C. to about 300° C. Curing the pre-cured hybrid metal composite structure may cinporise exposing the hybrid metal composite structure to the curing temperature for a period of time within a range of from about 30 minutes to about three (3) days (e.g., from about 30 minutes to about two (2) hours, from about two (2) hours to about twelve (12) hours, from about twelve (12) hours to about twenty-four (24) hours, from about twenty-four (24) hours to about two (2) days, from about two (2) days to about three (3) days).

Act 414 includes machining the cured hybrid metal composite structure. In some embodiments, machining the cured hybrid metal composite structure may include boring, trimming, and planarizing the hybrid metal composite structure. By way of nonlimiting example, one or more holes sized and configured to receive fasteners (e.g., bolts, studs, pins, etc.) may be machined in the hybrid metal composite structure. In some embodiments, the cured hybrid metal composite structure may be machined proximate lateral sides thereof where the hybrid metal composite structure may be mechanically coupled to another hybrid mechanical composite structure.

In some embodiments, the cured hybrid metal composite structure may be subjected to one or more of a densification process (e.g., a sintering process), a material conversion process (e.g., a pyrolyzation process), or a coating process. Whether or not the hybrid metal composite structure is subjected to one or more of a densification process and a material conversion process at least partially depends on the material composition of the matrix material of the fiber composite material structures of the hybrid metal composite structure. As a nonlimiting example, if the fiber composite material structures include an oxide-based ceramic matrix material, the hybrid metal composite structure may be sintered (e.g., at temperature within a range of from about 1000° C. to about 1350° C.) to densify the hybrid metal composite structure. As another nonlimiting example, if the fiber composite material structures include a cured non-oxide-based pre-ceramic matrix material, the hybrid metal composite structure may be pyrolyzed (e.g., at temperature within a range of from about 600° C. to about 1400° C.) convert at least a portion of the cured non-oxide-based pre-ceramic matrix material into a non-oxide-based ceramic matrix material.

The hybrid metal composite structure 100 (FIG. 1) formed according to the methods described herein may exhibit improved properties. For example, the hybrid metal composite structure 100 may exhibit a bearing strength where adjacent hybrid metal composite structures are operably coupled (e.g., bolted) together. In addition, the hybrid metal composite structure 100 may exhibit a reduced weight compared to conventional composite structures.

The metal plies 102 (FIG. 1) formed according to the methods described herein may exhibit an improved adhesion strength to the fiber composite material structure 104 (FIG. 1). In some embodiments, the metal plies 102 formed according to the methods described herein may be exposed to a shear stress from about 3.5 MPa to about 14 MPa, such as from about 5.5 MPa to about 10 MPa without delaminating from the fiber composite material structure 104.

Figure 5:
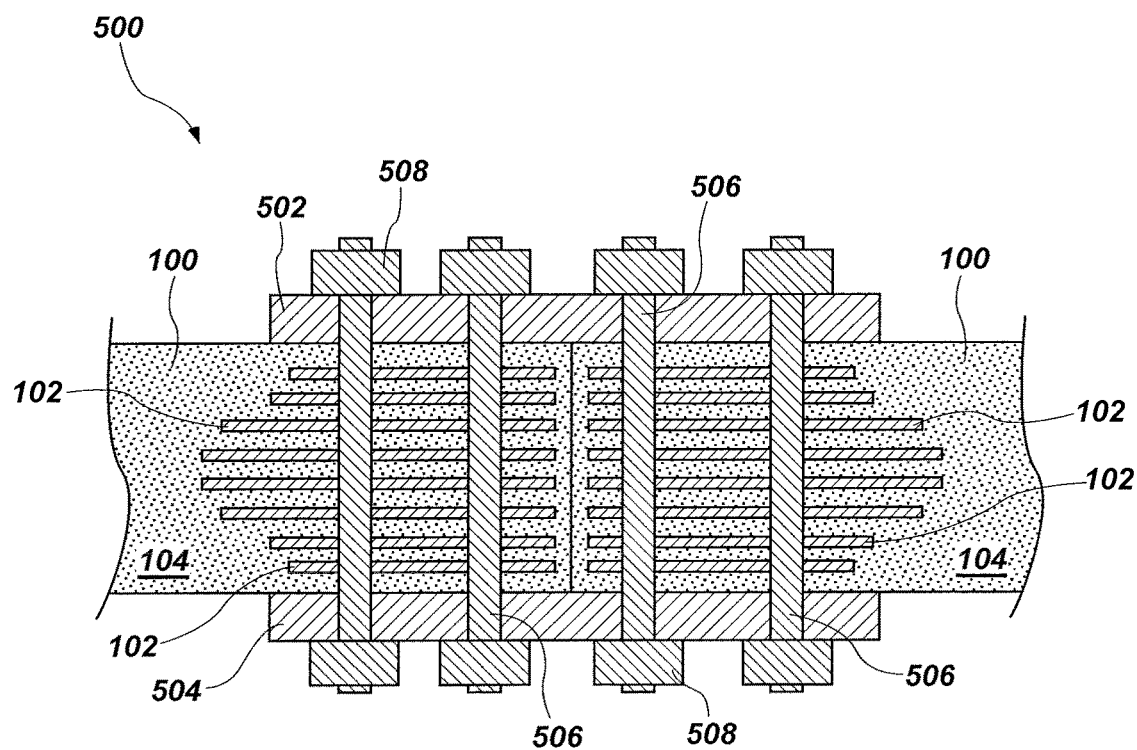
FIG. 5 is a cross-sectional view of an assembled, multi-component structure including two hybrid metal composite structures operably coupled together, according to embodiments of the disclosure.

FIG. 5 is a cross-sectional view of an assembled, multi-component structure 500 including two hybrid metal composite structures 100 operably coupled together with an outer joining ring 502 and an inner joining ring 504. The multi-component structure 500 may include layers of fiber composite material structures 104 and metal plies 102. The configurations (e.g., material compositions, peripheral sizes, peripheral shapes, components, component sizes, component shapes, component spacing, component features, component feature sizes, component feature shapes, component feature spacing, component feature density, component feature patterning, etc.) and positions of the fiber composite material structures 104 and the metal plies 102 may be substantially the same as, or may be different than the configurations and positions of the fiber composite material structures 104 and the metal plies 102 previously described with respect to FIG. 1. The configurations of each of the hybrid metal composite structures 100 may be substantially the same as one another, or may be different. In some embodiments, each of the hybrid metal composite structures 100 mirror each other. As used herein, the term "mirror" means and includes that at least two structures are mirror images of one another. For example, a first hybrid metal composite structure 100 (e.g., the left hybrid metal composite structure 100 in FIG. 1) and a second hybrid metal composite structure 100 (the right hybrid metal composite structure 100 in FIG. 1) may exhibit substantially the same material compositions, peripheral sizes, peripheral shapes, components (e.g., fiber composite material structures, metal plies, etc.), component sizes, component shapes, component spacing, component features (e.g., perforations, indentations, peaks, valleys, etc. in the metal plies), component feature sizes, component feature shapes, component feature spacing, component feature density, and component feature patterning as one another, but the first hybrid metal composite structure 100 may outwardly extend in a direction that opposes a direction in which the second hybrid metal composite structure 100 outwardly extends. As shown in FIG. 5, in some embodiments, the metal plies of each of the hybrid metal composite structures 100 are laterally positioned proximate an interface of the hybrid metal composite structures 100, and do not laterally extend across entireties of the first hybrid metal composite structure 100 or the second hybrid metal composite structure 100.

With continued reference to FIG. 5, one or more fasteners 506 (e.g., bolts, rods, studs, pins, etc.) may extend through the outer joining ring 502, one of the hybrid metal composite structures 100, and the inner joining ring 504 to secure the hybrid metal composite structure 100 to the outer joining ring 502 and the inner joining ring 504. The outer joining ring 502 and the inner joining ring 504 may extend over at least two hybrid metal composite structures 100 (e.g., the first hybrid metal composite structure 100 and the second hybrid metal composite structure 100), which may be operably coupled to the outer joining ring 502 and the inner joining ring 504 with one or more fasteners 506 and retaining members 508 (e.g., threaded nuts).

The metal plies 102 of the hybrid metal composite structures 100 may be located at end portions of the hybrid metal composite structures 100. The fasteners 506 may extend through the metal plies 102. The bearing strength of the bolted multi-component structure 500 may be improved due to the metal plies 102. In some embodiments, the hybrid metal composite structures 100 may include the metal plies 102 only at portions through which a fastener 506 extends (i.e., only at lateral ends of the hybrid metal composite structure 100). The metal plies 102 may enhance the bearing strength between each of the hybrid metal composite structures 100 and the fasteners 506.

Figure 6:
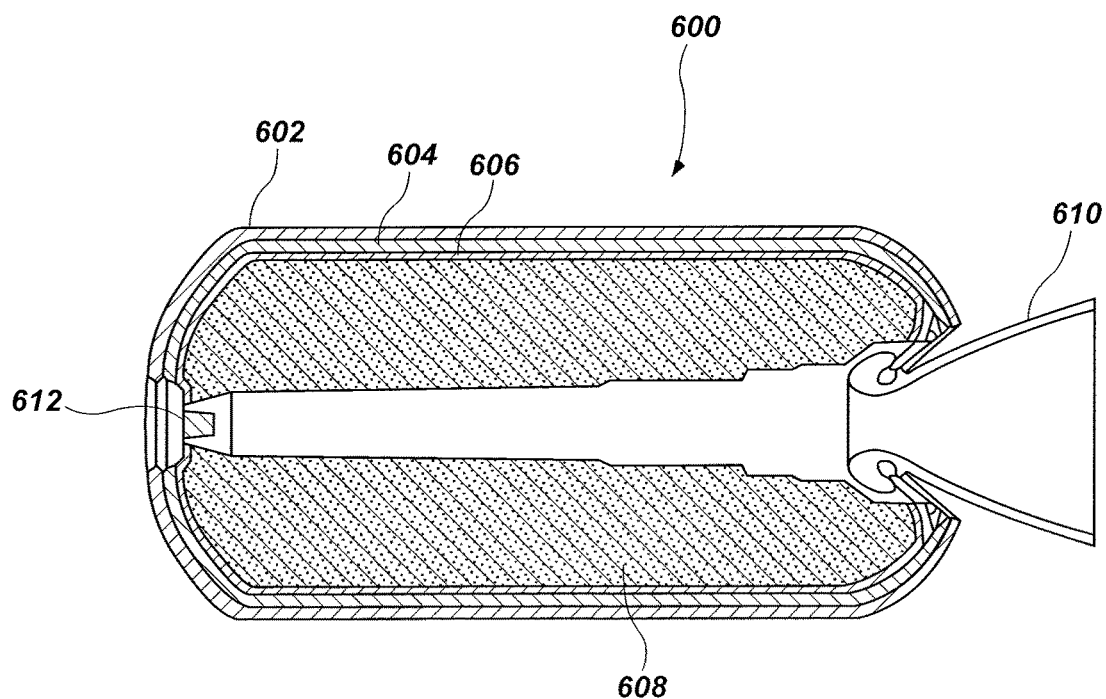
FIG. 6 is a simplified cross-sectional view of a rocket motor including one or more hybrid metal composite structures, according to an embodiment of the disclosure.

FIG. 6 is a simplified cross-sectional view of a rocket motor 600 including one or more hybrid metal composite structures, according to an embodiment of the disclosure.

The rocket motor 600 may, for example, be configured to be a component (e.g., a stage) of a larger assembly (e.g., a multi-stage rocket motor assembly). The rocket motor 600 may include an assembly comprising a casing 602, an insulation material 604, a liner 606, and a propellant structure 608 (e.g., a solid propellant such as a double-base propellant, an HTPB-based propellant, etc.). During operation, the insulation material 604 may protect the rocket motor casing 602 from thermal and erosive effects of particle streams generated from combustion of the propellant structure 608. The insulation material 604 may further be disposed on surfaces of a nozzle assembly 610 to protect the nozzle assembly 610 from hot exhaust gases. The liner 606 bonds the insulation material 604 to the propellant structure 608. The rocket motor 600 may further include an igniter 612 that may be activated to ignite the propellant structure 608.

The casing 602 may include a metal, a composite material, or a combination of metal and composite materials. In some embodiments, the casing 602 includes one or more hybrid metal composite structures 100 (FIG. 1, FIG. 5). For example, adjacent portions of the casing 602 may comprise hybrid metal composite structures 100 operably coupled together as described above with reference to FIG. 5. Forming the casing 602 from a plurality of coupled hybrid metal composite structures may permit at least some of the coupled hybrid metal composite structures to be reused following the use of the rocket motor 600.

The propellant structure 608 may be formed of and include at least one propellant material, such as at least one solid propellant. Various examples of suitable solid propellants and components thereof are described in Thakre et al., Solid Propellants, Rocket Propulsion, Vol. 2, Encyclopedia of Aerospace Engineering, John Wiley & Sons, Ltd. 2010, the disclosure of which document is hereby incorporated herein in its entirety by this reference. The solid propellant may be a class 4.1, 1.4, or 1.3 material, as defined by the United States Department of Transportation shipping classification, so that transportation restrictions are minimized. By way of non-limiting example, the propellant of the propellant structure 608 may be formed of and include a polymer having one or more of a fuel and an oxidizer incorporated therein. The polymer may be an energetic polymer or a non-energetic polymer, such as glycidyl nitrate (GLYN), nitratomethylmethyloxetane (NMMO), glycidyl azide (GAP), diethyleneglycol triethyleneglycol nitraminodiacetic acid terpolymer (9DT-NIDA), bis(azidomethyl)-oxetane (BAMO), azidomethylmethyl-oxetane (AMMO), nitraminomethyl methyloxetane (NAMMO), bis(difluoroaminomethyl)oxetane (BFMO), difluoroaminomethylmethyloxetane (DFMO), copolymers thereof, cellulose acetate, cellulose acetate butyrate (CAB), nitrocellulose, polyamide (nylon), polyester, polyethylene, polypropylene, polystyrene, polycarbonate, a polyacrylate, a wax, a hydroxyl-terminated polybutadiene (HTPB), a hydroxyl-terminated polyether (HTPE), carboxyl-terminated polybutadiene (CTPB) and carboxyl-terminated polyether (CTPE), diaminoazoxy furazan (DAAF), 2,6-bis(picrylamino)-3,5-dinitropyridine (PYX), a polybutadiene acrylonitrile/acrylic acid copolymer binder (PBAN), polyvinyl chloride (PVC), ethylmethacrylate, acrylonitrile-butadiene-styrene (ABS), a fluoropolymer, polyvinyl alcohol (PVA), or combinations thereof. The polymer may function as a binder, within which the one or more of the fuel and oxidizer is dispersed. The fuel may be a metal, such as aluminum, nickel, magnesium, silicon, boron, beryllium, zirconium, hafnium, zinc, tungsten, molybdenum, copper, or titanium, or alloys mixtures or compounds thereof, such as aluminum hydride ($AlH_3$), magnesium hydride ($MgH_2$), or borane compounds ($BH_3$). The metal may be used in powder form. The oxidizer may be an inorganic perchlorate, such as ammonium perchlorate or potassium perchlorate, or an inorganic nitrate, such as ammonium nitrate or potassium nitrate. Other oxidizers may also be used, such as hydroxylammonium nitrate (HAN), ammonium dinitramide (ADN), hydrazinium nitroformate, a nitramine, such as cyclotetramethylene tetranitramine (HMX), cyclotrimethylene trinitramine (RDX), 2,4,6,8,10, 12-hexanitro-2,4,6,8,10,12-hexaazaisowurtzitane (CL-20 or HNIW), and/or 4,10-dinitro-2,6,8,12-tetraoxa-4,10-diazatetracyclo-[$5.5.0.0^{5,9}.0^{3,11}$]-dodecane (TEX). In addition, the propellant of the propellant structure 608 may include additional components, such as one or more of a plasticizer, a bonding agent, a combustion rate modifier, a ballistic modifier, a cure catalyst, an antioxidant, and a pot life extender, depending on the desired properties of the propellant. These additional components are well known in the rocket motor art and, therefore, are not described in detail herein. The components of the propellant of the propellant structure 608 may be combined by conventional techniques, which are not described in detail herein.

With continued reference to FIG. 6, nozzle assembly 610 may be cooperatively associated with the casing 602 and the propellant structure 608 so as to produce a desired thrust. The nozzle assembly 610 may be stationary (e.g., fixed), or may be adjustable to selectively alter the course of flight of the rocket motor 600 (and, hence, of a launch vehicle including the rocket motor 600). In some embodiments, the nozzle assembly 610 includes a thrust nozzle, a flexible bearing assembly connected to the thrust nozzle and the casing 602, and at least one actuator connected to the thrust nozzle. Lateral movement of the flexible bearing assembly by way of the actuator may be used to modify the position of the thrust nozzle so as to control the direction of the rocket motor 600 (and, hence, of a launch vehicle including the rocket motor 600) during use and operation (e.g., flight) thereof. Suitable configurations (e.g., components, component shapes, component sizes, component materials, component arrangements, etc.) for the nozzle assembly 610 are well known in the rocket motor art and, therefore, are not described in detail herein.

Figure 7:
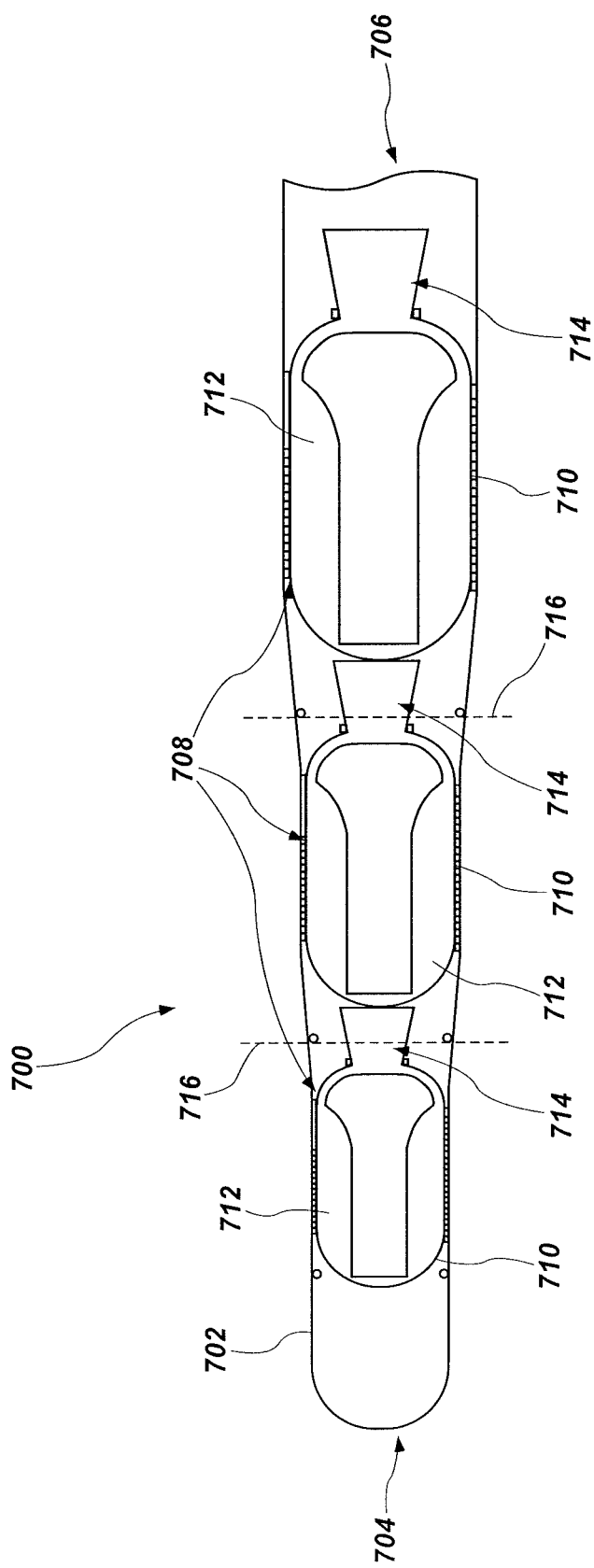
FIG. 7 is a simplified cross-sectional view of a multi-stage rocket motor assembly including one or more hybrid metal composite structures, according to an embodiment of the disclosure.

FIG. 7 is a cross-sectional view of a multi-stage rocket motor assembly 700, in accordance with an embodiment of the disclosure. The multi-stage rocket motor assembly 700 may include an outer housing 702 having a closed forward end 704 and an open aft end 706. The outer housing 702 may formed of and include one or more hybrid metal composite structures, such as one or more of the hybrid metal composite structures 100 previously described with respect to FIGS. 1 and 5. For example, the outer housing 702 may be formed of and include at least two (2) hybrid metal composite structures coupled (e.g., connected) to one another in a manner substantially similar to that previously described with reference to FIG. 5 for connecting the first hybrid metal composite structure 100 to the second hybrid metal composite structure 100. The multi-stage rocket motor assembly 700 may also include plurality of stages 708 provided in an end-to-end relationship with one another within the outer housing 702. For example, as shown in FIG. 7, the multi-stage rocket motor assembly 700 may include three (3) stages 708 each contained within the outer housing 702. In additional embodiments, the multi-stage rocket motor assembly 700 may include a different number of stages 708, such as from one (1) stage to ten (10) stages. The stages 708 may include casings 710, propellant structures 712 with the casings 710, and nozzle assemblies 714 physically connected to aft ends of the casings 710. One or more of the stages 708 may be substantially similar to the rocket motor 600 previously described with reference to FIG. 6. The outer housing 702 may be configured to be severable at locations 716, as indicated by dashed lines, associated with the stages 708 during use and operation of the multi-stage rocket motor assembly 700 (e.g., following combustion of the propellant structure 712 within a given one of the stages 708).

The hybrid metal composite structures (e.g., the hybrid metal composite structure 100 shown in FIG. 1) of the disclosure may exhibit improved properties as compared to conventional fiber composite material structures. For example, the hybrid metal composite structures including the metal plies 102 (FIG. 1) of the disclosure may exhibit enhanced strength, enhanced structural integrity, and reduced weight as compared to conventional fiber composite material structures. The metal plies may, for example, increase the bearing strength of the hybrid metal composite structures when the hybrid metal composite structures are coupled (e.g., by way of fixture assembly, such as a bolted fixture) to one or more other structures. In turn, multi-component structures (e.g., the multi-component structure 500 shown in FIG. 5), rocket motors (e.g., the rocket motor 600 shown in FIG. 6), and rocket motor assemblies (e.g., the multi-stage rocket motor assembly 700 shown in FIG. 7) including the hybrid metal composite structures may exhibit improved performance, increased efficiency, increased reliability, reduced costs (e.g., material costs, equipment costs, etc.), reduced weight, increased simplicity, and/or increased safety as compared to many conventional multi-component structures, rocket motors, and multi-stage rocket motor assemblies not including the hybrid metal composite structures.

Although the hybrid metal composite structure 100 (FIG. 1) has been described as being useful in adjoining case segments of a rocket case, the disclosure is not so limited. The hybrid metal composite structure 100 may be used in applications requiring fiber composite materials or applications requiring a low weight and exhibiting improved bearing strength. The hybrid metal composite structure 100 described herein facilitates use of fiber composite structures in aerospace and other applications where low bearing strength without excessive weight is conventionally a limiting factor.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of the disclosure.

What is claimed is:

1. A method of forming a hybrid metal composite structure, the method comprising:
    providing metal plies between layers of a fiber composite material structure, the metal plies each comprising:
        perforations extending therethrough;
        at least a portion of inside surfaces of the perforations having a surface roughness from about 0.5 μm $R_a$ and about 4.0 μm $R_a$;
        a first coating consisting of a silane coupling agent chemically bonded to a surface of the metal ply; and
        a second coating comprising a polymeric material chemically bonded to the first coating; and
    disposing each metal ply of the metal plies between layers of a fiber composite material structure to form alternating first layers of the metal plies and second layers of the fiber composite material, each layer of the fiber composite material structure including a fiber material dispersed within a matrix material comprising an epoxy, the second coating chemically bonded to the epoxy.

2. The method of claim 1, further comprising selecting the fiber composite material structure to comprise a carbon fiber composite material.

3. The method of claim 1, further comprising exposing the metal plies to one of sulfuric acid, nitric acid, hydrochloric acid, hydrofluoric acid, or combinations thereof.

4. The method of claim 1, further comprising selecting at least one metal ply to comprise titanium.

5. The method of claim 1, wherein providing metal plies comprises providing metal plies having a first coating comprising at least one of aminopropyl trimethoxysilane ($H_2N$ $(CH_2)_3Si$ $(OCH_3)_3$), aminopropyl triethoxysilane ($H_2N$ $(CH_2)_3Si$ $(OC_2H_5)_3$), glycidyloxypropyl trimethoxysilane ($C_9H_{20}O_5Si$), glycidyloxypropyl methyldimethoxysilane ($C_9H_{20}O_4Si$), or glycidyloxypropyl triethoxysilane ($C_{12}H_{26}O_5Si$).

6. The method of claim 1, wherein disposing each metal ply of the metal plies comprises disposing each metal ply of the metal plies proximate a lateral edge of the hybrid metal composite structure.

7. The method of claim 1, further comprising forming a bolt hole through the each metal ply of the metal plies and the at least one fiber composite material structure.

8. A method of forming a portion of a rocket case, the method comprising:
    forming at least one hybrid metal composite structure, forming the at least one hybrid metal composite structure comprising:
        forming perforations in each metal ply of a plurality of metal plies;
        abrasively blasting at least one surface of each metal ply of the plurality of metal plies to coarsen at least a portion of inside surfaces of the perforations of each metal ply of the plurality of metal plies to have a surface roughness from about 0.5 μm $R_a$ and about 4.0 μm $R_a$;
        forming a first coating consisting of a silane coupling agent chemically bonded to at least one surface of each metal ply of the plurality of metal plies; and
        forming a second coating comprising a polymeric material chemically bonded to the first coating of each metal ply of the plurality of metal plies; and
        incorporating the metal plies of the plurality of metal plies between a plurality of layers of a fiber composite material structure, each layer of the plurality of layers of the fiber composite material structure comprising a fiber material dispersed within a matrix material comprising an epoxy, wherein incorporating the metal plies of the plurality of metal plies between the plurality of layers of the fiber composite material structure comprises chemically bonding the second coating to the epoxy; and
    operably coupling the at least one hybrid metal composite structure to at least another hybrid metal composite structure, the at least another hybrid metal composite structure comprising at least another metal ply.

9. The method of claim 8, further comprising exposing each metal ply of the plurality of metal plies to at least one of an acid or a base.

10. The method of claim 8, further comprising exposing each metal ply of the plurality of metal plies to one of an acid or a base after exposing each metal ply of the plurality of metal plies to another of the acid or the base.

11. The method of claim 8, wherein operably coupling the at least one hybrid metal composite structure to at least another hybrid metal composite structure comprises bolting the at least one hybrid metal composite structure to the at least another hybrid metal composite structure.

12. The method of claim 8, further comprising forming one or more bolt holes in each of the at least one hybrid metal composite structure and the at least another hybrid metal composite structure.

13. The method of claim 12, wherein forming one or more bolt holes in the at least one hybrid metal composite structure comprises forming the one or more bolt holes in a portion of the at least one hybrid metal composite structure located or to be located proximate the at least another hybrid metal composite structure for the operable coupling by extending bolts through aligned bolt holes of the at least one hybrid metal composite structure and the at least another hybrid metal composite structure.

14. A hybrid metal composite structure, comprising:
a plurality of alternating first layers and second layers, wherein:
the first layers comprise a fiber composite material structure including a fiber material dispersed within a matrix material, the matrix material comprising an epoxy; and
the second layers each comprise the fiber composite material structure and at least one metal ply, the at least one metal ply comprising perforations extending therethrough, at least a portion of inside surfaces of the perforations having a surface roughness from about 0.5 µm $R_a$ and about 4.0 µm $R_a$ and comprising a first coating consisting of a silane coupling agent chemically bonded to a surface of the at least one metal ply and a second coating comprising a polymeric material chemically bonded to the first coating and to the epoxy.

15. The hybrid metal composite structure of claim 14, wherein the at least one metal ply comprises titanium.

16. The hybrid metal composite structure of claim 14, wherein the fiber composite material structure comprises carbon fiber.

17. The hybrid metal composite structure of claim 14, wherein a surface of the at least one metal ply comprises a plurality of peaks and a plurality of valleys.

18. The hybrid metal composite structure of claim 14, wherein the silane coupling agent comprises at least one of aminopropyl trimethoxysilane, aminopropyl triethoxysilane, glycidyloxypropyl methyldimethoxysilane, or glycidyloxypropyl triethoxysilane.

19. The hybrid metal composite structure of claim 14, wherein the hybrid metal composite structure exhibits a uniform thickness.

20. The hybrid metal composite structure of claim 14, wherein the polymeric material comprises a phenolic material, an epoxy material, or a combination thereof.

21. The hybrid metal composite structure of claim 14, wherein the polymeric material comprises a phenol formaldehyde resin, a phenolic primer, a bisphenol F epoxy, or a phenolic novolac epoxy.

22. The hybrid metal composite structure of claim 14, wherein the first coating has a thickness from about one monolayer to about 500 nm.

23. The hybrid metal composite structure of claim 14, wherein the second coating has a thickness from about 1 µm to about 15 µm.

24. The hybrid metal composite structure of claim 14, further comprising one or more fasteners extending through at least the at least one metal ply.

25. The hybrid metal composite structure of claim 14, wherein at least one of the first layers has a different material composition than at least another of the first layers.

\* \* \* \* \*

UNITED STATES PATENT AND TRADEMARK OFFICE
CERTIFICATE OF CORRECTION

PATENT NO. : 10,603,873 B2
APPLICATION NO. : 15/250404
DATED : March 31, 2020
INVENTOR(S) : Benjamin W. C. Garcia et al.

Page 1 of 1

It is certified that error appears in the above-identified patent and that said Letters Patent is hereby corrected as shown below:

In the Specification

| | | |
|---|---|---|
| Column 5, | Line 31, | change "material faulted by" to --material formed by-- |
| Column 9, | Line 65, | change "to faun a" to --to form a-- |
| Column 11, | Line 16, | change "4.0 pin $R_a$," to --4.0 μm $R_a$,-- |
| Column 15, | Line 20, | change "with and faun" to --with and form-- |
| Column 15, | Line 24, | change "of faulting the" to --of forming the-- |
| Column 15, | Line 26, | change "faulting the hybrid" to --forming the hybrid-- |
| Column 17, | Line 5, | change "may cinporise" to --may comprise-- |

Signed and Sealed this
Fifth Day of May, 2020

Andrei Iancu
*Director of the United States Patent and Trademark Office*